US00RE45371E

(19) United States
(12) Reissued Patent
Simons

(10) Patent Number: US RE45,371 E
(45) Date of Reissued Patent: Feb. 10, 2015

(54) METHOD FOR ONLINE INFORMATION SHARING FOR COMPLETING ELECTRONIC FORMS

(75) Inventor: Geoffrey W. Simons, Seattle, WA (US)

(73) Assignee: Zanni Assets Limited Liability Company, Dover, DE (US)

(21) Appl. No.: 12/708,297

(22) Filed: Feb. 18, 2010

Related U.S. Patent Documents

Reissue of:
(64) Patent No.: 7,334,184
Issued: Feb. 19, 2008
Appl. No.: 09/523,410
Filed: Mar. 10, 2000

U.S. Applications:
(60) Provisional application No. 60/123,605, filed on Mar. 10, 1999.

(51) Int. Cl.
*G06F 17/27* (2006.01)

(52) U.S. Cl.
USPC ..... 715/224; 715/225

(58) Field of Classification Search
USPC ..... 715/224, 225
See application file for complete search history.

(56) References Cited

U.S. PATENT DOCUMENTS

| | | | | |
|---|---|---|---|---|
| 5,537,586 | A | 7/1996 | Amram et al. | 1/1 |
| 5,710,884 | A * | 1/1998 | Dedrick | 709/217 |
| 5,710,887 | A | 1/1998 | Chelliah et al. | |
| 5,754,981 | A * | 5/1998 | Veeneman et al. | 705/26 |
| 5,774,874 | A * | 6/1998 | Veeneman et al. | 705/27 |
| 5,799,157 | A | 8/1998 | Escallon | 705/27 |
| 5,862,223 | A | 1/1999 | Walker et al. | 705/50 |
| 5,872,915 | A * | 2/1999 | Dykes et al. | 726/5 |
| 5,878,141 | A | 3/1999 | Daly et al. | 705/78 |

(Continued)

FOREIGN PATENT DOCUMENTS

| | | | |
|---|---|---|---|
| WO | WO98/04976 | * | 2/1998 |
| WO | 0031657 | | 6/2000 |

OTHER PUBLICATIONS

Cingil; "Supporting Global User Profiles Through Trusted Authorities;" Data Management Issues in Electronic Commerce; vol. 31; Issue 1; Mar. 2002; pp. 11-17.*
Alexa.com Screen Capture via the Way Back Machine (archive.org), dated Feb. 29, 2000.*
Lemay, Laura; Java 1.1: Interactive Course; 1997; The Waite Group.*
Cozzens, Lisa; JavaScript Tutorial; www.cs.brown.edu/courses/bridge/1998/res/javascript-tutorial.html; 1998.*

(Continued)

*Primary Examiner* — Andrew Dyer
(74) *Attorney, Agent, or Firm* — Brundidge & Stanger, P.C.

(57) ABSTRACT

Methods are disclosed for gathering information from different sources to be used to automatically fill in online forms. The information is collected using a persona of an individual. A persona is created by filtering a larger set of raw data for that user so that only certain fields are allowed to be seen and used by others. An individual can have several personas, each assigned to a particular other individual, such as a family member or a friend. The individual allowing one of his personas to be shared is the information provider and the user requesting the information is the information requester. The information is taken from both the provider and requester, and used by a vendor in a form, filled out by the information requester. In one embodiment, the information requester is a "gift giver" and the provider is a "gift receiver." The gift giver is requesting shipping and other information from the gift receiver, who can grant one of his personas to the particular gift giver. The information, along with billing information from the gift giver, is used to fill out a vendor online form.

27 Claims, 9 Drawing Sheets

(56) References Cited

U.S. PATENT DOCUMENTS

| | | | | | |
|---|---|---|---|---|---|
| 5,937,064 | A | * | 8/1999 | Eick et al. | 1/1 |
| 5,960,411 | A | * | 9/1999 | Hartman et al. | 705/26 |
| 5,966,697 | A | | 10/1999 | Fergerson et al. | 705/26 |
| 5,970,474 | A | * | 10/1999 | LeRoy et al. | 705/27 |
| 5,987,440 | A | | 11/1999 | O'Neil et al. | 705/44 |
| 5,995,756 | A | * | 11/1999 | Herrmann | 717/178 |
| 6,023,683 | A | | 2/2000 | Johnson et al. | 705/26 |
| 6,029,141 | A | | 2/2000 | Bezos et al. | 705/27 |
| 6,055,516 | A | | 4/2000 | Johnson et al. | 705/27 |
| 6,064,382 | A | | 5/2000 | Diedrich et al. | |
| 6,083,279 | A | * | 7/2000 | Cuomo et al. | 717/118 |
| 6,101,482 | A | | 8/2000 | DiAngelo et al. | 705/26 |
| 6,125,353 | A | | 9/2000 | Yagasaki | 705/27 |
| 6,182,127 | B1 | | 1/2001 | Cronin, III et al. | 709/219 |
| 6,192,380 | B1 | * | 2/2001 | Light et al. | 715/207 |
| 6,199,079 | B1 | * | 3/2001 | Gupta et al. | 715/207 |
| 6,256,623 | B1 | | 7/2001 | Jones | 707/765 |
| 6,320,952 | B1 | | 11/2001 | Bruno et al. | 379/211.02 |
| 6,327,598 | B1 | | 12/2001 | Kelley et al. | 715/205 |
| 6,334,114 | B1 | | 12/2001 | Jacobs et al. | 705/26 |
| 6,345,278 | B1 | | 2/2002 | Hitchcock et al. | 1/1 |
| 6,360,205 | B1 | * | 3/2002 | Iyengar et al. | 705/5 |
| 6,381,597 | B1 | | 4/2002 | Lin | |
| 6,490,602 | B1 | * | 12/2002 | Kraemer | 715/236 |
| 6,496,855 | B1 | * | 12/2002 | Hunt et al. | 709/217 |
| 6,499,042 | B1 | * | 12/2002 | Markus | 715/217 |
| 6,499,052 | B1 | | 12/2002 | Hoang et al. | 709/203 |
| 6,505,172 | B1 | | 1/2003 | Johnson et al. | 705/27 |
| 6,510,459 | B2 | | 1/2003 | Cronin, III et al. | 709/219 |
| 6,535,880 | B1 | | 3/2003 | Musgrove et al. | 1/1 |
| 6,578,011 | B1 | | 6/2003 | Forward | 705/14.39 |
| 6,594,644 | B1 | * | 7/2003 | Van Dusen | 705/39 |
| 6,629,135 | B1 | | 9/2003 | Ross, Jr. et al. | 709/218 |
| 6,643,624 | B2 | | 11/2003 | Philippe et al. | 705/26 |
| 6,725,222 | B1 | | 4/2004 | Musgrove et al. | 705/27 |
| 6,772,139 | B1 | | 8/2004 | Smith, III | 707/748 |
| 6,785,671 | B1 | | 8/2004 | Bailey et al. | |
| 6,856,963 | B1 | | 2/2005 | Hurwitz | 705/10 |
| 6,879,960 | B2 | | 4/2005 | Nascenzi et al. | |
| 6,892,185 | B1 | | 5/2005 | Van Etten et al. | 705/27 |
| 6,895,388 | B1 | | 5/2005 | Smith | 705/26 |
| 7,006,993 | B1 | | 2/2006 | Cheong et al. | |
| 7,047,211 | B1 | | 5/2006 | Van Etten et al. | 705/26 |
| 7,058,598 | B1 | | 6/2006 | Chen et al. | 705/26 |
| 7,185,069 | B2 | | 2/2007 | Costin et al. | 709/219 |
| 7,330,826 | B1 | | 2/2008 | Porat et al. | |
| 7,373,314 | B2 | | 5/2008 | Aliabadi | |
| 7,412,409 | B2 | | 8/2008 | Aliabadi | |
| 2001/0011250 | A1 | | 8/2001 | Pallenghe et al. | 705/41 |
| 2001/0016828 | A1 | | 8/2001 | Phillippe et al. | |
| 2002/0002496 | A1 | | 1/2002 | Miller et al. | 705/26 |
| 2002/0038255 | A1 | | 3/2002 | Tarvydas et al. | |
| 2002/0065737 | A1 | | 5/2002 | Aliabadi et al. | |
| 2002/0174018 | A1 | | 11/2002 | Bunger et al. | 705/26 |
| 2002/0194125 | A1 | | 12/2002 | Shimada | 705/40 |
| 2003/0093321 | A1 | | 5/2003 | Bodmer et al. | |
| 2005/0273396 | A1 | | 12/2005 | Aliabadi et al. | |
| 2006/0041485 | A1 | | 2/2006 | Tarvydas et al. | |
| 2008/0033834 | A1 | | 2/2008 | Tarvydas et al. | |
| 2008/0033839 | A1 | | 2/2008 | Tarvydas et al. | |
| 2008/0046337 | A1 | | 2/2008 | Tarvydas et al. | |
| 2008/0046338 | A1 | | 2/2008 | Tarvydas et al. | |
| 2008/0162298 | A1 | | 7/2008 | Aliabadi et al. | |
| 2008/0306835 | A1 | | 12/2008 | Agura et al. | |
| 2009/0281890 | A1 | | 11/2009 | Aliabadi et al. | |
| 2009/0281914 | A1 | | 11/2009 | Tarvydas et al. | |
| 2009/0281927 | A1 | | 11/2009 | Aliabadi et al. | |
| 2011/0035293 | A1 | | 2/2011 | Tarvydas et al. | |

OTHER PUBLICATIONS

Printouts of website for "About eWallet;" www.ewallet.com; Jan. 11, 1999; 4 pages.*

Printout of websites for "Transactor Networks" (CitiWallet); www.transactor.net; Jan. 11, 1999; 4 Pages.*

Sirbu, Marvin et al.; "NetBill: An Internet Commerce System Optimized for Network-Delivered Services;" IEEE Personal Communications; Aug. 1995; pp. 34-39.*

"Gator offers one-click shopping at over 5,000 e-commerce sites today;" Internet Publication, unknown origin; Jan. 14, 1999.*

"E-Commerce Leaders Announce Univeral Formats for Simplified Online Payments;" Internet Publication, unknown origin; Jun 14, 1999.*

"CDW Computer Centers: CDW Computer Centers Take Online Shopping to the Next Level;" Business Wire; May 18, 1998.*

Bonisteel, S.; "Company Sees One Shopping 'Basket' for Entire Web;" Newsbytes; Oct. 28, 1999.*

"BuyerZone.com Announces Most Advanced eCommerce System for Small to Mid-Sized Businesses;" Business Wire; Dec. 13, 1999.*

Client; Free On-Line Dictionary of Computing; foldoc.org; Oct. 27, 1997; p. 1.*

USPTO; Notice of Allowance dated Nov. 19, 2007 in U.S. Appl. No. 09/523,410.

USPTO; Office Action dated Oct. 5, 2006 in U.S. Appl. No. 09/523,410.

USPTO; Advisory Action dated Aug. 8, 2006 in U.S. Appl. No. 09/523,410.

USPTO; Final Office Action dated May 15, 2006 in U.S. Appl. No. 09/523,410.

USPTO; Office Action dated Nov. 28, 2005 in U.S. Appl. No. 09/523,410.

USPTO; Advisory Action dated Sep. 1, 2005 in U.S. Appl. No. 09/523,410.

USPTO; Final Office Action dated Jul. 8, 2005 in U.S. Appl. No. 09/523,410.

USPTO; Office Action dated Jul. 9, 2003 in U.S. Appl. No. 09/523,410.

Preddy, M., "Mall of Michigan Debuts on Internet in May," Detroit News, p. B1, Apr. 18, 1997.

O'Brien, Jim, Don't Check Out Without Them—Desktop Shopping Agents, Computer Shopper, p. 85, Mar. 2000.

USPTO, Office Action in Patent U.S. Appl. No. 12/128,587, dated Jun. 13, 2011, pp. 2-7.

"SmartShop.com Simplifies the Online Shopping Experience, New Site Promises to Redifine Internet Shopping;" Business Editors; Business Wire; Nov. 29, 1999.

Sirbu, Marvin, et al.; "NetBill: An Internet Commerce System Optimized for Network-Delivered Services;" IEEE Personal Communications; 34-39, Aug. 1995.

Unknown: "Gator offers one-click shopping at over 5,000 e-commerce sites today;" Internet Publication, origin unknown, Jan. 14, 1999.

Unknown: "E-Commerce Leaders Announce Univeral Formats for Simplified Online Payments;" Internet Publication, origin unknown, Jun. 14, 1999.

Anonymous, "CDW Computer Centers: CDW Computer Centers Takes Online Shopping to the Next Level;" Business Wire; May 18, 1998.

Bonisteel, S., "Company Sees One Shopping 'Basket' for Entire Web Oct. 28, 1999," Newsbytes, Oct. 28, 1999.

Anonymous, "BuyerZone.com Announces Most Advanced eCommerce System for Small to Mid-Sized Businesses;" Business Wire; Dec. 13, 1999.

* cited by examiner

302

| User (304) | Category (306) | Type (308) | Short display name (310) |
|---|---|---|---|
| Home. (312) | Physical Contact Information, Online Contact Information Demographic Data | Info. | Home |
| Work. (314) | Physical Contact Information, Online Contact Information Demographic Data | WorkInfo. | Work |
| Billing. (316) | Physical Contact Information, Online Contact Information Demographic Data Financial Data | BillInfo. | Billing |
| Shipping. (318) | Physical Contact Information, Online Contact Information Demographic Data | Info. | Shipping |

320

| Info. | Category | Type | Short display name |
|---|---|---|---|
| Name. (322) | Physical Contact Information Demographic Data | Person Name. | Name |
| Address. | Physical Contact Information Demographic Data | Address. | Postal Address |
| Phone. | Physical Contact Information | PhoneNum. | Phone Number |
| Fax. | Physical Contact Information | PhoneNum. | Fax Number |
| Internet. | Online contact Information | Internet. | Internet |

| WorkInfo. | Category | Type | Short display name |
|---|---|---|---|
| Name. | Physical Contact Information Demographic Data | PersonName. | Name |
| Employment. | Demographic Data | Employment. | Employment |
| Address. | Physical Contact Information Demographic Data | Address. | Postal Address |
| Phone. | Physical Contact Information | PhoneNum. | Phone Number |
| Fax. | Physical Contact Information | PhoneNum. | Fax Number |
| Internet. | Online Contact Information | Internet. | Internet |

FIG. 3A

302

| BillInfo. | Category | Type | Short display name |
|---|---|---|---|
| Name. | Physical Contact Information Demographic Data | PersonName. | Name |
| Address. | Physical Contact Information Demographic Data | Address. | Postal Address |
| Phone. | Physical Contact Information | PhoneNum. | Phone Number |
| Fax. | Physical Contact Information | PhoneNum. | Fax Number |
| Internet. | Online Contact Information | Internet. | Internet |
| Credit Card | Financial Data | CreditCard. | Favorite Credit Card |

| PersonName. | Category | Type | Short display name |
|---|---|---|---|
| Prefix | Demographic Data | Text | Prefix |
| First | Physical Contact Information | Text | First Name |
| Middle | Physical Contact Information | Text | Middle Name |
| Last | Physical Contact Information | Text | Last Name |
| Suffix | Demographic Data | Text | Suffix |

| Address. | Category | Type | Short display name |
|---|---|---|---|
| Street1 | Physical Contact Information | Text | Street 1 |
| Street2 | Physical Contact Information | Text | Street 2 |
| City | Physical Contact Information | Text | City |
| StateProv | Physical Contact Information | Text | State/Province |
| PostalCode | Demographic Data | Text | Post/Zip Code |
| Country | Demographic Data | Text | Country |

| PhoneNum. | Category | Type | Short display name |
|---|---|---|---|
| AreaCode | Physical Contact Information | Text | Area Code |
| Number | Physical Contact Information | Text | Number |
| Extension | Physical Contact Information | Text | Extension |

FIG. 3B

| Internet. | Category | Type | Short display name |
|---|---|---|---|
| Email | Online Contact Information | Text | Email |
| HomePage | Online Contact Information | Text | Home Page |

| Employment | Category | Type | Short display name |
|---|---|---|---|
| Employer | Demographic Data | Text | Employer |
| Department | Demographic Data | Text | Department |
| JobTitle | Demographic Data | Text | Job Title |

| Credit Card. | Category | Type | Short display name |
|---|---|---|---|
| Type | Financial Data | Text | Card Type |
| Number | Financial Data | Text | Account Number |
| ExpMonth | Financial Data | Text | Expiration Month |
| ExpYear | Financial Data | Text | Expiration Year |

FIG. 3C

METHOD FOR ONLINE INFORMATION SHARING FOR COMPLETING ELECTRONIC FORMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a Reissue of U.S. application Ser. No. 09/523,410 (filed Mar. 10, 2000), now U.S. Pat. No. 7,334,184 (issued Feb. 19, 2008). Ser. No. 09/523,410* claims the benefit of priority under 35 USC § 119(e) to provisional Patent Application No. 60/123,605, filed Mar. 10, 1999, naming Geoffrey W. Simons as inventor.

U.S. application Ser. No. 09/231,644, filed Jan. 15, 1999, commonly owned, is incorporated by reference herein for all purposes.

BACKGROUND OF THE INVENTION

The present invention relates generally to computer software for filling out form documents over a computer network. More particularly, the present invention provides a method and system for sharing information among users for the purpose of automatically filling out fields in an electronic form document.

The present invention describes a process for purchasing goods and services over an electronic computer network, namely the World Wide Web, for the purpose of Gift Shopping. Gift Shopping is defined as the act of buying a good or a service (the Product) for another person. Within the scope of the electronic computer network, Gift Shopping entails that the Gift Giver release personal information pertaining to the billing of the Product, and that the Gift Recipient release personal information pertaining to the shipping, size, and type of the Product.

Thus, it is desirable to be able to share personal information with other users on a network. In such a system, a gift giver, for example, can access certain items of information, collectively referred to as a persona, which a gift receiver has indicated can be accessed by others. A user can have a number of personas, each one used by a group of other users or one other user.

SUMMARY OF THE INVENTION

To achieve the foregoing, methods, apparatus, and computer-readable mediums are disclosed which provide an online shopper can share information with intended gift receivers. The information sharing can be used on numerous non-affiliated sites. That is, the sites at which the goods are purchased do not have to be within, for example, a portal's shopping mall or any type of "walled garden." Thus, the online gift giver can access information of gift receivers from a wide variety of non-associated and non-affiliated sites. While there are features similar to information sharing within restricted online shopping malls and networks of sites, information sharing outside these confines is presently unavailable.

The present invention is a technique use to gather information from different sources to be used to automatically fill in online forms. The information is collected using a persona of an individual. A persona is created by filtering a larger set of raw data for that user so that only certain fields are allowed to be seen and used by others. An individual can have several personas, each assigned to a particular other individual, such as a family member or a friend. The individual allowing one of his personas to be shared is the information provider and the user requesting the information is the information requester. The information is taken from both the provider and requester, and used by a vendor in a form, filled out by the information requester. In one embodiment, the information requester is a "gift giver" and the provider is a "gift receiver." The gift giver is requesting shipping and other information from the gift receiver, who can grant one of his personas to the particular gift giver. The information, along with billing information from the gift giver, is used to fill out a vendor online form.

In one aspect of the invention a method of allowing an information requester, such as a gift giver, to access data from an information provider, such as a gift receiver, in order to complete an online merchant form is described. A filtered data set is created that contains data the information provider is willing to share with particular third-party users, including the information requester. An online merchant form is retrieved from a merchant or service provider site upon request by an information requester, the online merchant form having numerous fields. Data from the information requester is inserted into the appropriate fields in the form, such as billing information. Access to the filtered data set is granted by the information provider to the information requester. This enables data from the filtered data set to be inserted into the appropriate fields in the form, such as shipping information. The online form being filled out is from an online merchant or service provider that is not necessarily affiliated with other online merchants, such as being in an online shopping mall, a "walled garden," or network of sites associated with a portal.

BRIEF DESCRIPTION OF THE DRAWINGS

The invention will be better understood by reference to the following description taken in conjunction with the accompanying drawings in which:

FIGS. 3A, 3B, and 3C are table diagrams showing the field names and format of registered user data in accordance with one embodiment of the present invention.

DETAILED DESCRIPTION

Figure 1A:
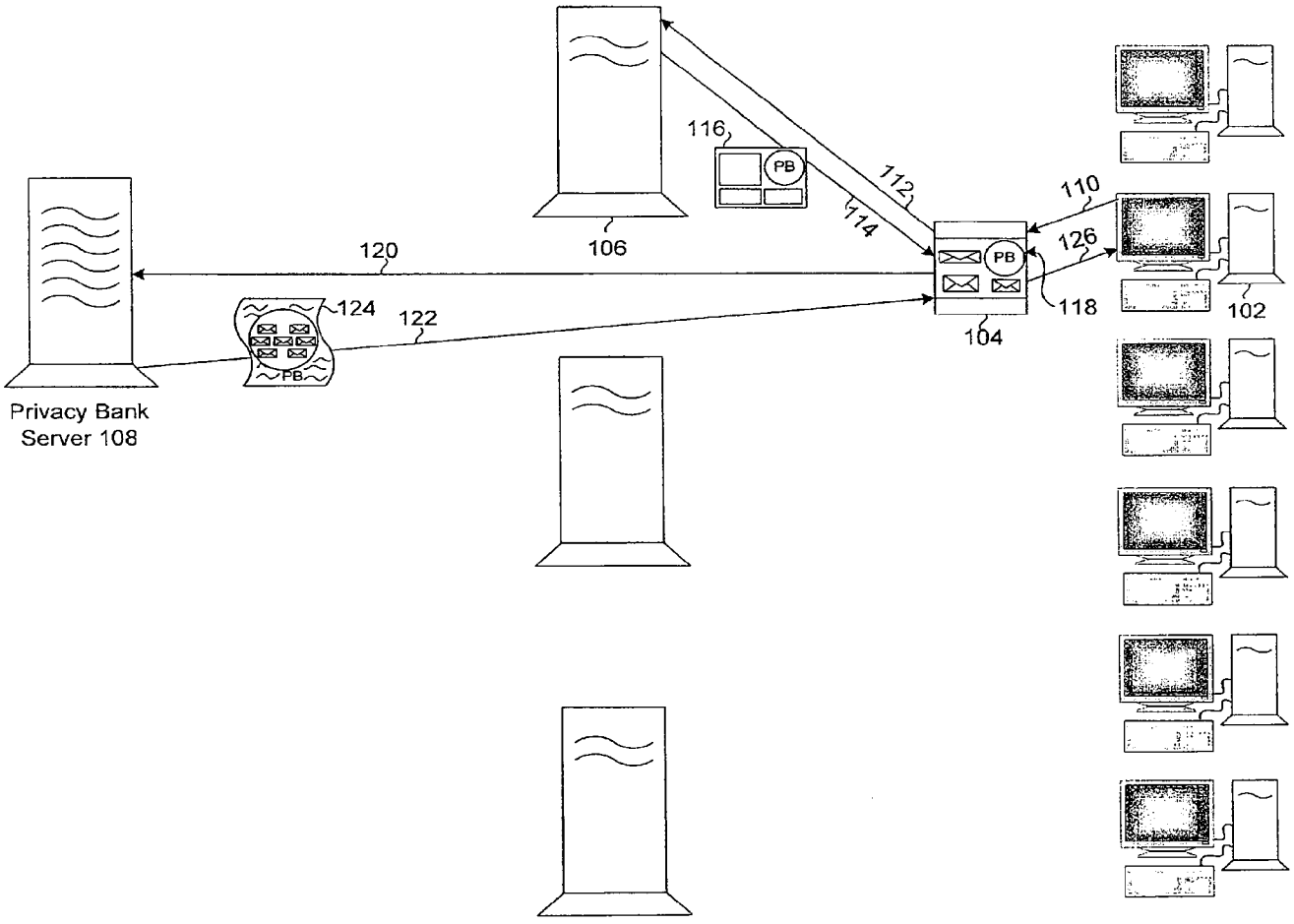
FIG. 1A is a diagrammatical representation of a system for automatically filling in electronic form documents in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for automatically filling in electronic forms on a computer and not requiring a user to download or install any resident software on the computer is described in the various figures. As the presence of merchants and services increases on the Internet, electronic commerce or e-commerce will grow. More and more consumers will resort to the Internet, for example, to purchase goods and services for themselves or others (e.g., gift shopping). This will typically require the consumer/user to provide at least some data, either the users own or another individuals, to the merchant typically through filling out an electronic form having various fields, most commonly names, addresses, credit card numbers, phone numbers, etc. For consumers purchasing goods from numerous merchant sites and possibly using different computers (e.g. using a computer at work, using another computer at home, and yet another one while travelling), manually filling in these forms repeatedly can become tedious and inefficient. The present invention seeks to alleviate the burden of filling in electronic forms, while informing the consumer/user of privacy precautions taken by a particular merchant site, and not require the user to download any resident software. Inherent in the latter feature is allowing the consumer to use the processes of the present invention from any computer connected to the network, the Internet in particular.

The present invention uses a remote server or "privacy bank," a novel electronic resource that responds to requests for data by preparing and transmitting a specialized document in the form of a JavaScript. This JavaScript is formed dynamically by the privacy bank upon receipt of the request for data. The JavaScript created by the privacy bank is a "profile" or mapping between field names in a particular form the user needs to fill in at a particular merchant site (e.g. "www.fishermanstore.com") and standardized field names stored in the privacy bank server. Once the user's browser program is served this profile from privacy bank, most of the fields in the fishermanstore form are automatically filled in. In the described embodiment, the user becomes a member of the privacy bank resource by providing personal information, also referred to as the raw data, to privacy bank once. This raw data can be updated from time to time by the user if desired. In addition, several filtered raw data sets or "personas" can be created for use by others who may need to access the user's information. In another embodiment, the user can enter privacy rules or requirements once when initially becoming a member. The user does not need to download any software from privacy bank or any other resource. In the described embodiment, the merchant (e.g. The Fisherman Store) becomes an affiliate member of the privacy bank network by providing a sample document of its form or forms. Privacy bank can then build a mapping between fields in the merchant's form and the standardized fields in its own database.

FIG. 1A is a block diagram of a system for automatically filling out electronic form documents in accordance with one embodiment of the present invention. A number of end-user computers are shown on the right side of the diagram. These computers can be client computers in a network with access to the Internet or be part of an intranet. In the described embodiment an end-user computer 102 is a stand-alone computer with access to the Internet and contains an Internet browser program, a browser window for which is shown at 104. In the center of the diagram is a number of Web servers. A particular Web server 106 is a server for a merchant Web site, such as www.fishermanstore.com to which users or consumers can visit to purchase goods online over the Internet. On the left side of the diagram is a specialized electronic resource referred to in the described embodiment as a privacy bank server computer 108, also connected to the Internet.

The process of automatic electronic form completion begins with a user downloading the form from a Web site such as fishermanstore site. Returning to FIG. 1A, a user/consumer on computer 102 ("user 102") opens a browser window 104 in an Internet browser program such as Netscape Navigator or Internet Explorer, depicted by arrow 110. User 102 then goes to www.fishermanstore.com shown by arrow 112 via the browser and decides to purchase goods. User 102 then downloads from the Web site contained on Web server 106 an electronic purchasing form that needs to be completed as depicted by arrow 114. A purchasing form 116, typically an HTML document, is returned and downloaded into and displayed in browser window 104. At this juncture, user 102 would normally have to "manually" fill in each field in purchasing form 116. Much of this information is typically standard: name, address, phone number, payment method, user email address, etc. In accordance with one embodiment of the present invention, user 102 can "click" on a privacy bank icon or button in form 116 and have the form automatically filled in.

As stated earlier, it is assumed in this discussion that www.fishermanstore.com is registered with and thus an affiliate member of the privacy bank service assessable from privacy bank server 108. Being an affiliate member of the privacy bank service, purchasing form 116 contains a privacy bank icon or button 118. By clicking on privacy bank icon 118, user 102 essentially completes a process for automatically filling in form 116 by transparently transmitting a completed form to the privacy bank service on server 108, depicted by an arrow 120. The information needed for filling in the form is transmitted to user 102 once form 116 (an HTML document) is parsed, which occurs when form 116 is downloaded. This process is described in greater detail in FIG. 4. User 102 informs privacy bank server 108 of the identity of the user and of which Web site and which form on that Web site (if more than one) the user wishes to have filled in. This information is transmitted to privacy bank server 108, unbeknownst to user 102, when form 116 is downloaded. Techniques for accomplishing this are described below. Once privacy bank server 108 receives a request from registered user 102 (by virtue of an external link in form 116 executed when the form is parsed by user 102), it begins preparing information needed to fill in form 116 on user computer 102. In the described embodiment, the information sent to user computer 102 is a JavaScript program 124 referred to as a "profile." Explained briefly, this profile contains a mapping of privacy bank standardized fields and fields in purchasing form 116 and "raw," generally personal, data associated with user 102. The content of this profile and JavaScript program in general is described in greater detail in FIGS. 7A and 7B below. Once received by the browser program on user computer 102, the filled out purchasing form 116 is displayed to user 102 as depicted by arrow 126. This occurs when user 102 presses or clicks on privacy bank icon 118. The information needed to complete form 116 is already resident in the browser program. At this juncture, user 102 can decide whether to proceed with submitting the form (typically after filling out a few more fields such as which items to purchase, quantity, etc.) or declining to submit the form, perhaps after reviewing the fishermanstore's Web site privacy safeguards or for any other reason.

Figure 1B:
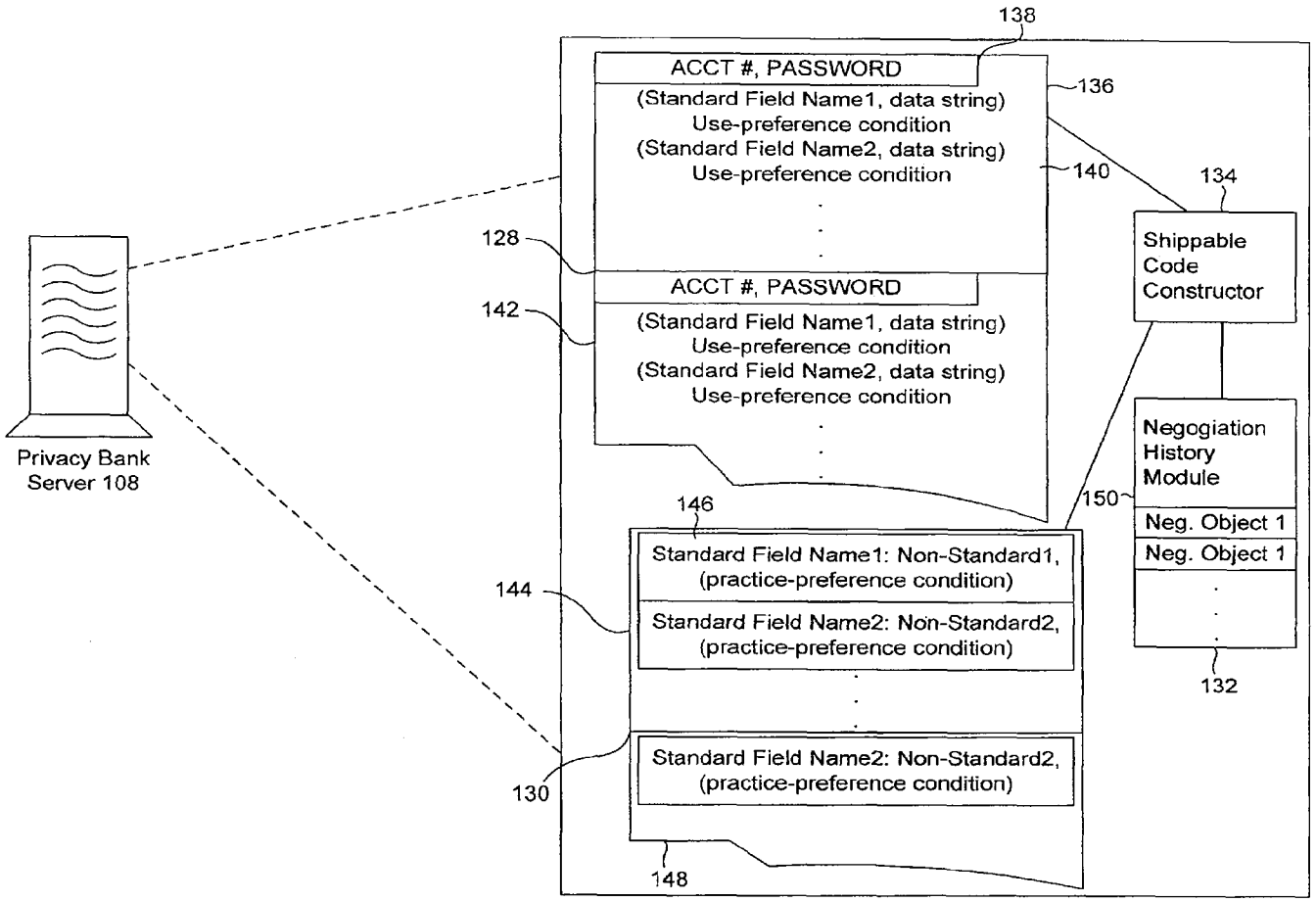
FIG. 1B is a block diagram showing components of a server enabling the automatic insertion of data in to an electronic form on a remote computer in accordance with one embodiment of the present invention.

FIG. 1B is a block diagram showing components of a privacy bank server enabling the automatic filling in of electronic forms on a remote user computer. A privacy bank server, such as server 108 in FIG. 1A, contains several functional and storage components needed for compiling the data needed for filing in a form, such as form 116. Shown in FIG. 1B are four major components of a privacy bank server in the described embodiment. These components and storage areas include a raw data profile storage area 128, a form mapping storage area 130, a negotiation history module 132, and a shippable code constructor 134. Raw data profile storage area 128 contains sets of data relating to registered users of the privacy bank service, one set or profile shown in area 136. A registered user has a unique account number that can be used as an identifier and a password, shown in an area 138. The standard field names set by the privacy bank service, discussed in greater detail in FIGS. 8A, 8B, and 8C, are paired with a user entered data string (such as first name or home street address), followed by a use-preference condition. This data is contained in an area 140. Another profile for another registered user is shown in an area 142. Each registered user has a similar raw data profile.

Form mapping area 130 includes multiple form mappings, an example of which is shown in an area 144. Each electronic form that is registered with the privacy bank service by an online merchant or seller (i.e. an affiliate member) has a form mapping. A privacy bank standard field name, as discussed below in FIGS. 3A, 3B, and 3C, and as mentioned above in area 140, is matched or mapped with a "non-standard" field name from the electronic form registered with the service. For example, a non-standard field name for a person's last name could be "Last Name," "Surname" or simply "Last." Different forms use different variations of names for this field and for other fields. This would be mapped against the privacy bank "standard" field name, which in the described embodiment, is "Person-Namelast." Also contained in area 146 is a practice-preference condition provided by the online merchant or seller when registering the form. As with the use-preference condition in area 140, this condition is used by negotiation history module 150 and shippable code constructor 134, and is discussed in greater detail below in FIG. 7. Another mapping 148 having the same format for another registered form follows area 144.

Negotiation history module 132 is used to determine which fields in the electronic form will be automatically filled in by the privacy bank server. A process associated with negotiation history module 132 is described in greater detail in FIG. 7. Module 132 includes multiple negotiation objects, an example of which is shown in an area 150. In the described embodiment, each negotiation object corresponds to one "non-standard" field in the form. Described briefly, negotiation object 150 contains information as to whether the field in the form should be filled in based on privacy and use preferences set by the user (as conveyed in use-preference condition in area 140) and compared to intended practices (as conveyed by practice-preference condition in area 146). This comparison is performed in the negotiation history module, which includes a negotiator or comparator for comparing these conditions. Specific conditions in the described embodiment are described below. If it is determined that the non-standard field in the form will be filled in, a data string, shown in area 140, will be included in negotiation object 150. Shippable code constructor 134 accesses component 132 and storage areas 128 and 130, to derive a software module to be transmitted to a user computer. In the described embodiment, the software module is a JavaScript program which is transmitted to and executed by a browser in the user computer, thereby inserting the data strings into the form fields.

Figure 2:
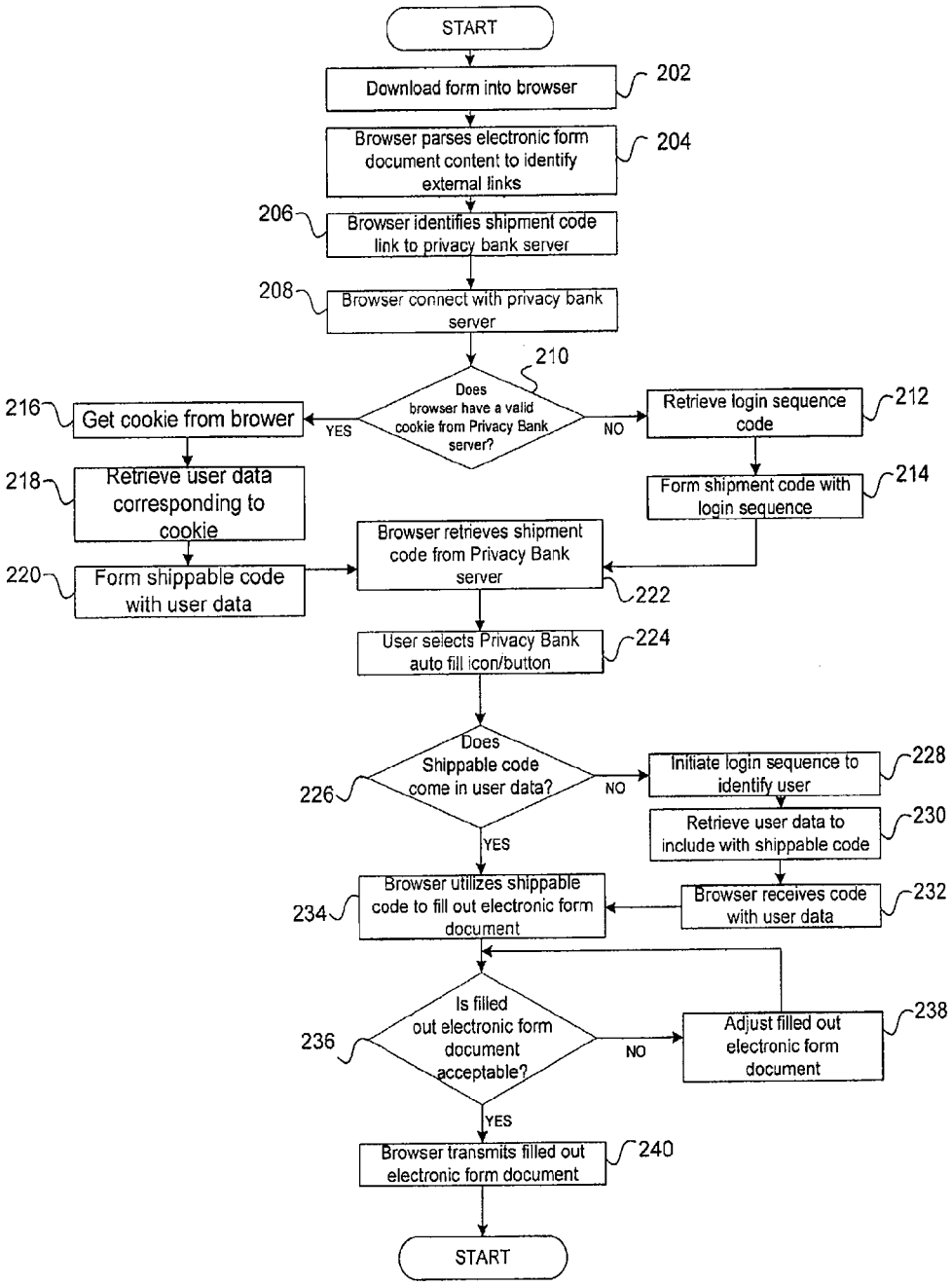
FIG. 2 is a flow diagram of a process for automatically filling in an electronic form document in accordance with one embodiment of the present invention.

FIG. 2 is a flow diagram of a process for automatically filling in electronic forms in a computer network in accordance with one embodiment of the present invention. The process described below can be performed in a configuration of servers and computers as described in FIG. 1A above. At a step 202 an online user/consumer desiring to purchase certain goods on the Internet downloads an electronic form for making a purchase into the user's browser program. At step 204 the browser parses the electronic form content, typically an HTML document, to identify all external links. As is commonplace for Web pages, the HTML contains links to other external Web sites from which content or other types of data is retrieved. In many instances, a Web page is a composite of different components from various sites embedded in a core HTML document. An example is an external link to an ad server to retrieve a banner ad component of a core HTML document. In this case, the electronic form can be seen as a core HTML document. This parsing is done automatically by the browser and is a well known feature.

At step 206 the browser identifies an external link to the privacy bank server. In the described embodiment, this link will necessarily be present since the Web site is an affiliated site of the privacy bank service network of registered sites. A description of what "registered" implies in this context is described in greater detail below. At step 208, the browser executes the external link to connect the browser to the privacy bank server. The external link is referred to in the described embodiment as a shippable code link to the privacy bank server. The shippable code in this context is a JavaScript program that is transmitted from the privacy bank server to the user computer and browser. This shippable code enables the electronic form to be filled in automatically in a process that is described in greater detail below. At step 210, once the privacy bank server has been contacted via the shippable code link in the electronic form, the privacy bank server determines whether the user computer or browser has a valid state identifier, referred to as a "cookie", previously assigned to it by the privacy bank server. A cookie is an identifier assigned by a Web site, whether a Web server or a server such as the privacy bank server, to a user/visitor when the user visits the Web site for the first time in a given session (the time from which a user logs onto the Web and the time he or she exits the Web by exiting the browser). The cookie, assigned by a Web site, belongs to a particular user. In the described embodiment, the user keeps this cookie during its session (a temporary cookie) and if the user goes back to that Web site during that session, it shows the Web site that cookie from which the Web site can identify the user and retrieve characteristics of that user from its data repository. As is known in the art of Internet application programming, cookies can also be permanent in that they subsist with a user after the user has logged off the browser and can be used again in a new session. The concept and implementation of cookies themselves are well known in the field of Internet and, more generally, computer network programming.

If the privacy bank server determines that the user computer or browser does not have a valid cookie, it implies that the user has not yet logged into the privacy bank service. If so, control goes to step 212 where the privacy bank server retrieves a login sequence code. This code will trigger a login sequence and enable the user to log in to or register with the privacy bank service at a later step in the process, as described in greater detail below. At step 214, the privacy bank server forms a completed package of shippable code containing the retrieved login sequence code, such that the login sequence will be triggered at a later step in the process. At step 222, the browser retrieves this completed package of shippable code from the privacy bank server. The shippable code is then stored in the browser residing on the user's computer, and is executable upon a user trigger, which is described in greater detail below.

If the privacy bank server determines that the user/browser making contact by downloading the electronic form and executing the external link has a valid cookie, control goes to step 216 where the privacy bank server gets and reads the user's cookie. In this context, having a valid cookie indicates that the user has already gone through the login sequence recently, for example during the existing Internet session, and thus it is not necessary for the user to go through the login sequence again. By reading the user's cookie, the privacy bank server can determine who the user is and thus can retrieve the user's raw data stored by privacy bank. The contents and format of this raw personal data is described in greater detail in FIGS. 8A, 8B, and 8C below. At step 218, the privacy bank server retrieves the user data for the user identified by the valid cookie. The privacy bank server couples this user data and an identifier, such as a URL (uniform resource locator), to determine how the electronic form document should be filled. At step 220, the privacy bank server forms a completed package of shippable code (item 124 in FIG. 1A) containing the user data that will be used to fill out the form document. In the described embodiment, this shippable code, referred to as a profile, is in the form of a JavaScript program. This shippable code is formed from information in the privacy bank memory that will enable the form document to be filled out automatically at a step later in the process. At step 222 the browser receives the shippable code, or profile, from the privacy bank server, and now has access to it on the user computer, if desired by the user. This profile is stored in the browser residing on the user's computer, and is executable upon a user trigger.

Assuming the user wants to have the electronic form automatically filled out using privacy bank, he or she executes a user trigger. In the described embodiment, this trigger occurs when the user clicks on an "autofill" button contained in the form and associated with privacy bank at step 224. By clicking on the autofill button, the user allows the browser to execute the shippable code or profile stored thereon. At step 226, the shippable code determines whether it contains user data which would permit it to fill out the form document. If user data is contained within the shippable code residing on the browser, control goes to step 234 where the browser utilizes the shippable code and user data to fill out the electronic form document. Of course, user data being present in the shippable code is dependent upon the browser having a pre-existing valid cookie when the form document was initially retrieved, as described above.

If, however, user data is not contained within the shippable code residing on the browser, control goes to step 228 where the login sequence is initiated in order to identify the presently unknown user. The shippable code utilized by the browser in this step contains the login sequence code, which is a result of the browser not having a pre-existing valid cookie when the form document was initially retrieved, as described above. Once the user completes the login sequence at step 228, the privacy bank server assigns a cookie to the user/browser thereby enabling it to recognize the user and messages from the user's browser in subsequent transactions. At step 230, the privacy bank server retrieves the user data for the identified user, couples this user data and an identifier, such as a URL (uniform resource locator), to determine how the electronic form document should be filled, and forms a completed package of shippable code containing the user data that will be used to fill out the form document. This step is substantially similar to steps 218 and 220, as described above. At step 228, the browser receives the shippable code, or profile, from the privacy bank server, and now has access to it on the user computer. This shippable code now contains user data that allows the form document to be filled out automatically. At this stage, control proceeds to step 234, where the browser utilizes the shippable code and user data to fill out the electronic form document. Further input from the user, such as re-clicking on the "autofill" button, is not required. In other words, once the user properly completes the login sequence, the form is then filled out automatically, and it is not necessary for the user to click on the "autofill" button again.

At step 236, the user visually examines the filled out form and the privacy features offered by the Web site and decides whether the form is acceptable. If the user finds that the form needs further adjustment, the user adjusts the document at step 238. This may be done manually, or through any supplemental automated process, such as a client-based macro. This can involve filling in fields that could not be filled in by the profile sent by the privacy bank server (in other words, fields that could not be filled out from the raw data). Such fields can include, for example, which items being purchased and the quantity of items. It can also include updated personal information such as a new address or credit card number. In this case, the user simply types over the information already in the fields. Control then returns to step 236, which is satisfied presumably after going through step 238 once. At step 240 the browser submits the filled out electronic form eventually sending it to the merchant's Web server once the user clicks on a Submit form button in the browser window. In the described embodiment, the filled out form is first sent to the privacy bank server unbeknownst to the user or at least transparent to the user. The completed form is received and examined by the privacy bank server which updates its raw data repository to reflect any changes the user may have made to his or her personal information. The privacy bank server then posts a message back to the user computer (according to HTTP protocol the server must send a message back to the user computer when it receives an HTML document from it). In the described embodiment, the message it sends back or posts to the user's browser is similar to a "Click Here To Continue" type screen to the user. Hidden behind this message is the completed form that was sent to the privacy bank server. Presumably, the user will click to continue and by doing so transmits the hidden completed form to the merchant's Web server. In other preferred embodiments, the completed form is sent to both the privacy bank server and the merchant's Web server at the same time. In yet another preferred embodiment, the completed form is posted automatically from the privacy bank server directly to the merchant's site without any additional input from the user. At this stage the automatic form filling process is complete.

FIGS. 3A, 3B, and 3C are high-level table diagrams showing how fields containing the raw data and preferences for a user are organized on the privacy bank server in accordance with one embodiment of the present invention. A top-level User table 302 has four columns: User 304, Category 306, Type 308, and Short display name 310. User Table 302 has four areas of data under column User 304 represented by four rows: Home 312, Work 314, Billing 316, and Shipping 318. In the described embodiment, the user is presented with these four areas of data when registering with the privacy bank service and enters information by going through each of these data areas. Skipping Category 306 for the moment, column Type 308 takes the raw data tree down one level from the top level represented by table 302. For example, the Type for data area Home 312 is Info. This performs as a pointer or link to an Info table 320. The first column 322 of table 320 is labeled Info but the other three columns are the same as shown in table 302; that is, Category 306, Type 308, and Short display name 310.

At table 320, the user begins entering data that will be used for her home information and for Shipping since data area 318 for Shipping in table 302 also has an Info in its Type column 308. A Name row 322 has in its Type column 308 a reference to yet another table PersonName, shown as table 324. Similar to table 302 and 320, PersonName table 324 has a first column labeled PersonName and the same three columns as the other tables. All five data areas in PersonName table 324: Prefix, First, Middle, Last, and Suffix have as a Type a primitive type referred to as Text in the described embodiment. Text represents a data string that is the actual data item stored in the privacy bank server. By examining the Type column 308 of each of the data areas, a user enters all the raw personal data. An actual data item is entered at each Type box containing Text, indicating a primitive type, or a leaf node when viewed as a tree structure. If the Type column does not contain "Text," another table exists that refines the data area further.

To follow another example, under the data area Billing 316 shown in table 302, its Type 308 indicates BillInfo and not Text. A table BillInfo has six further data areas, none of which have a Text Type, so no actual data values can be found at this level. Taking the CreditCard data area as an example, its Type indicates "CreditCard." Table CreditCard, shown in FIG. 3C, has four data areas: Type, Number, ExpMonth, and ExpYear, all of which are of Type Text, which contain actual data values.

Short display name column 310 contains a string that is displayed to the user through a user registration graphical user interface of the described embodiment. The user follows the data tree via a user interface using the Short display name strings as field names or guides to entering the data. The data areas that have primitive Types, which in the described embodiment is Text, are the privacy bank field names that are mapped with the legacy field names in the electronic forms registered with the service. In the described embodiment, the privacy bank names include (in abbreviated form):

| | | |
|---|---|---|
| PersonName.Prefix | Address.Street1 | PhoneNum.AreaCode |
| PersonName.First | Address.Street2 | PhoneNum.Number |
| PersonName.Last | Address.City | PhoneNum.Extension |
| PersonName.Suffix | Address.StateProv | |
| | Address.PostalCode | |
| | Address.Country | |
| Internet.Email | Employment.Employer | |
| Internet.HomePage | Employment.Department | |
| | Employment.JobTitle | |
| CreditCard.Type | | |
| CreditCard.Number | | |
| CreditCard.ExpMonth | | |
| CreditCard.ExpYear | | |

Category column 306 is related to privacy settings set by the user and are tied to the preferences set by a user and defined in terms of the conditions as described above. The conditions or use thresholds in the described embodiment are marketing (targeted), system administration, personalization, research and development, and completion of activity (i.e. ordering). The Categories available in the described embodiment and as shown in the tables of FIGS. 3A, 3B, and 3C, are Physical Contact Information, Online Contact Information, Demographic Data, and Financial Data. The relationship between the Categories and the conditions of the described embodiment can be described as a table five-row, four-column table (a 20 cell table) where each condition is one row in the table and each Category is one column in the table.

The present invention is an extension to a Form AutoFill Server using Personal Information sharing between Individuals to fill in electronic forms that are a part of the Form AutoFill and/or Gift Shopping service (the Service). The Form AutoFill Server is used to dispatch JavaScript code to the Web Browser, which enables the form to be filled. The Form AutoFill Server is a use of a Light Code Server, which serves Shippable Code Segments that are executed on the Web Browser's machine. By allowing Individuals to share their information with other Individuals, the Form AutoFill Server can provide data elements from two or more Individuals during a Privacy Negotiation (see Privacy Negotiation).

The essence of Gift Shopping is that more than one Persona is used to fill a form. A Persona is defined as a data repository containing an Individual's personal information along with the privacy preferences that indicate how the Individual wants his or her data treated. Users of the Service may have multiple Personae as well as permission to use parts of other Individuals' Personae. There are two kinds of Gift Shopping that need to be covered. The first is Gift Shopping for people who are not necessarily subscribers/members of the Service. The second is Gift Shopping for people who are subscribers/members of the Service. In the latter case, we have to cover the mechanism for releasing permission to use a Persona of an Individual by another Individual for Gift Shopping purposes.

Figure 4:
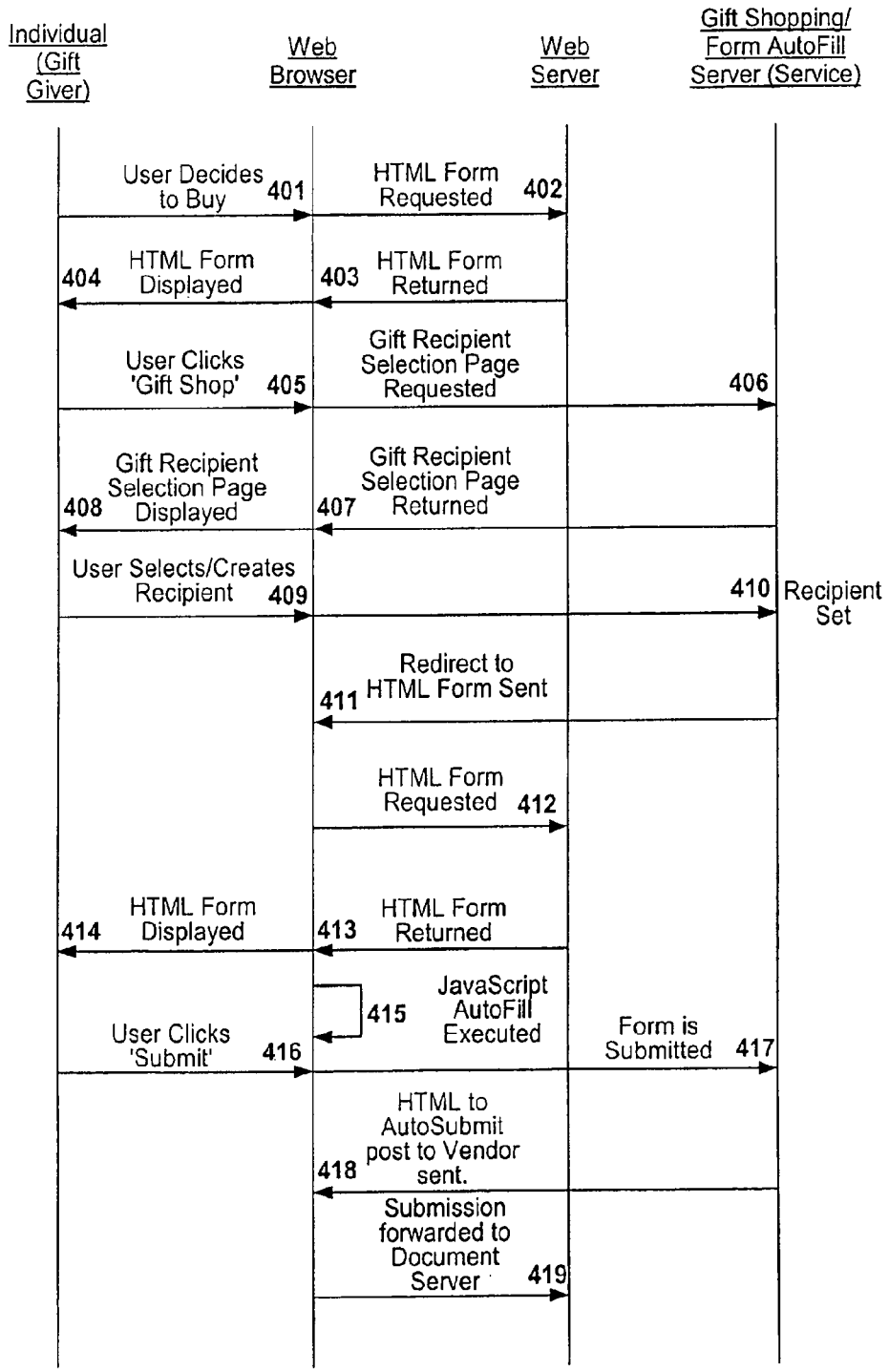
FIG. 4 is a sequence diagram outlining a process of conducting purchasing gifts over a distributed network in accordance with one embodiment of the present invention.

FIG. 4 is a flow diagram of a process of an Individual (Gift Giver), who is Gift Shopping online and purchases a product from a Product Vendor that subscribes to the privacy bank service. They would like to buy a Product 401 that the Vendor is offering through an online form. The Gift Giver corn-ands the browser to request a form from the Vendor 402. The Vendor returns the document to the browser 403, which in turn displays the form to the Gift Giver 404. The Gift Giver clicks the 'Gift Shop' button 405, which is embedded in the HTML form at the Vendor's web site. The 'Gift Shop' button is the trigger that requests the Gift Recipient Selection form from the Service 406. Since the intended Recipient is not a member of the Service, the Gift Giver may elect to create a new Persona or use a Persona that they have created in the past for Gift Shopping 409. The Gift Giver must fill in shipping information and any information related to the Product for a new Persona. During the selection of the Gift Recipient, a session parameter is set to identify which Persona to use for a Gift Recipient 410 when the Privacy Negotiation is to be conducted. After completing the Recipient creation, the browser is sent a document 411 that automatically requests the HTML form from the Vendor 412. The HTML form is returned to the browser 413, which again displays the form to the Gift Giver 414. Each time the form is loaded, it makes a request to the Form AutoFill Server, which conducts a Privacy Negotiation (see Privacy Negotiation) between electronic agents representing the Vendor, the Gift Giver, and the Gift Recipient if the Gift Giver is logged into the Service. JavaScript code is returned to the browser and executed there 415, filling the form with the results from the Privacy Negotiation. The Gift Giver then submits the form by clicking a 'Submit' button 416, which commands the browser to post the submission to the Service 417. After processing the submission, the browser receives a document 418, which commands the browser to submit the information to the Vendor's Web Server 419.

A Gift Giver, who is Gift Shopping online, visits a Product Vendor that subscribes to the Service. The Gift Giver would like to buy a Product the Vendor is offering 401. The browser requests an HTML form from the Vendor 402. The HTML form is returned to the browser 403, which is then displayed to the Gift Giver 404. The Gift Giver clicks the 'Gift Shop' button 405, which makes the request for the Gift Recipient Selection form from the Service 406. The 'Gift Shop' button is embedded in the HTML form at the Vendor's web site. The Gift Recipient Selection Page is returned to browser 407, which is displayed to the Gift Giver 408. The Gift Giver may select a Recipient's Persona 409 that has been made accessible to the Gift Giver by the Gift Recipient (see Sharing Personae). The browser posts the Gift Recipient Selection to the Service 410. The browser is sent a document 411 that automatically requests the HTML form from the Vendor 412. The HTML form is returned to the browser 413, which again displays the form to the Gift Giver 414. Each time the form is loaded, it makes a request to the Service, which conducts a Privacy Negotiation (see Privacy Negotiation) between electronic agents representing the Vendor, the Gift Giver, and the Gift Recipient if the Gift Giver is logged into the Service. JavaScript code is returned to the browser and executed there 415, filling the form with the results from the Privacy Negotiation. The Gift Giver then submits the form by clicking a 'Submit' button 416, which commands the browser to post the submission to the Service 417. After processing the submission, the browser receives a document 418, which commands the browser to submit the information to the Vendor's Web Server 419.

A Privacy Negotiation is the process of determining if a Vendor's stated Privacy Practices meet the requirements of an Individual's Privacy Preferences. A standard Privacy Negotiation is conducted between a single Information Buyer (Vendor's agent) and a single Information Seller (Individual's agent). In the case of Gift Shopping the Information Seller is a composite of Personae, which are separate Information Sellers. This composite Persona is achieved through a networked solution. A Message Router is used to direct BIDs from the Information Buyer to the Information Seller that they apply to. Each Information Seller connected to the Router has a mask assigned which controls which BIDs route to them based on what part of the Service's personal information data schema is being requested. This is the same model as an electronic computer network router, which routes data packets to a given machine based on the routing table of the router. Using this model allows for the individual Personae (Information Sellers) to respond to a BID based on the Privacy Preferences stored in the Persona that the BID gets routed to.

Figure 5:
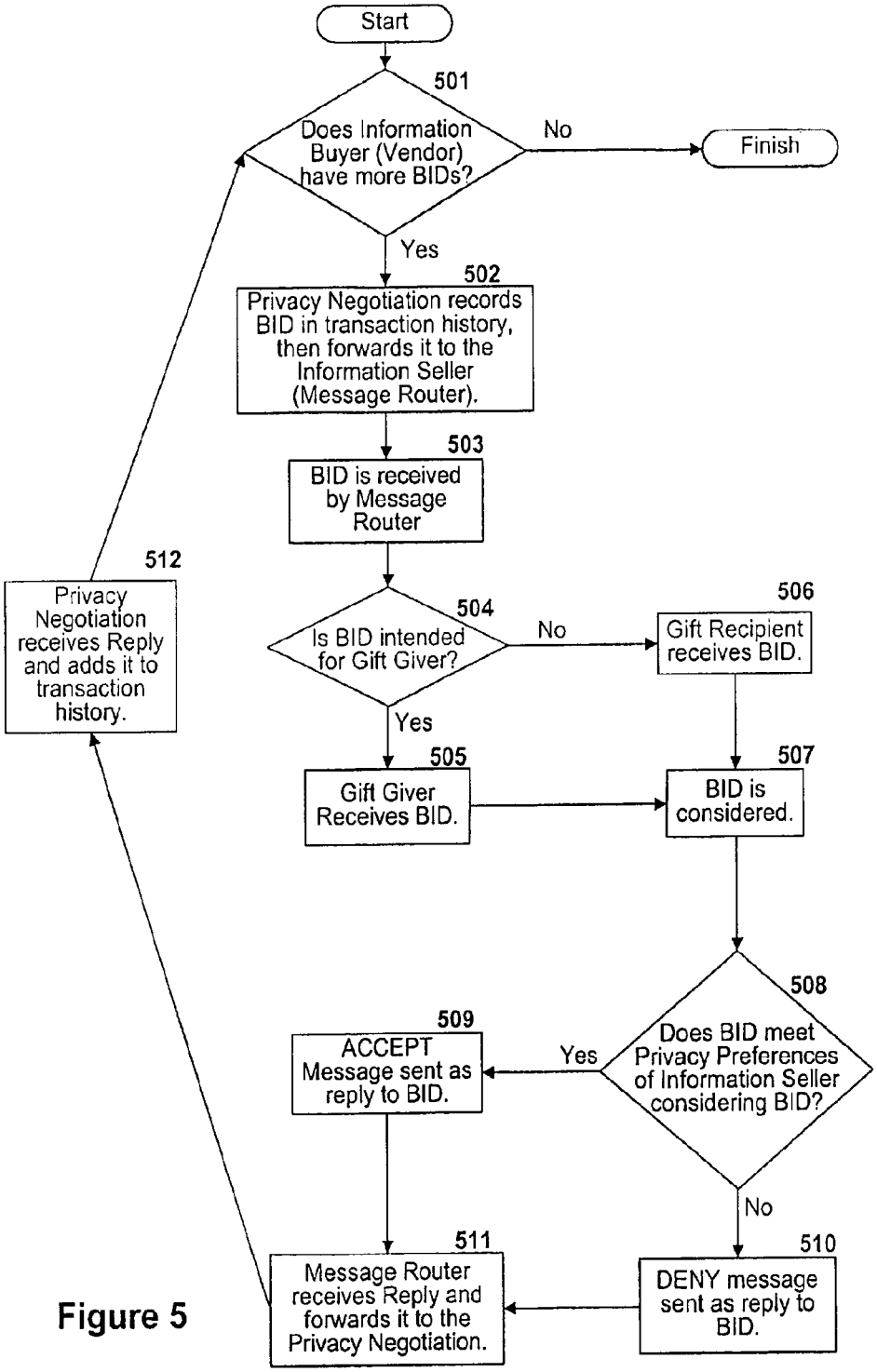
FIG. 5 is a flowchart describing a privacy negotiation for gathering information associated with purchasing gifts over a distributed network in accordance with one embodiment of the present invention.

FIG. 5 is a flow diagram of a Privacy Negotiation that begins by requesting if the Information Buyer 501, which is an agent for the Vendor in the current model, has any more BIDs. If Yes, the Privacy Negotiation records the BID in its transaction history and forwards it to the Information Seller 502, which is a Message Router in the case of Gift Shopping. The Message Router receives the BID 503, and determines if it is intended for the Gift Giver's Information Seller or the Gift Recipient's Information Seller based on the mappings that define Gift Shopping 504. In the instance there is no gift shopping, control from 503 goes straight to 508 where it is determined if the BID meets certain privacy preferences of the information seller. Returning to step 504, if the BID is intended for the Gift Giver's Information Seller, it receives the BID 505. If the BID is intended for the Gift Recipient's Information Seller, it receives the BID 506. The BID is considered by the Information Seller that receives it 507. The Information Seller determines if the BID meets the Privacy Preferences stored inside of it 508. If the BID is accepted, an ACCEPT message is sent as the reply 509. If the BID is rejected, a DENY message is sent as the reply 510. The Message router receives the response from the Information Seller it sent the BID to and forwards the response to the Privacy Negotiation 511. The Privacy Negotiation records the response in its transaction history in step 512 and returns to step 501. If the Information Buyer has no more BIDs, the Privacy Negotiation is complete.

In order for an Individual (Gift Giver) to use another Individual's (Gift Recipient) Persona, the Gift Recipient must explicitly grant access to the Gift Giver. A Gift Giver may request access from a Gift Recipient, after which the Recipient may grant or deny access. A Gift Recipient may also add a Gift Giver without receiving a request. Once access is granted, the Gift Recipient is added to the Gift Giver's list of Gift Recipients for use while Gift Shopping.

Figure 6:
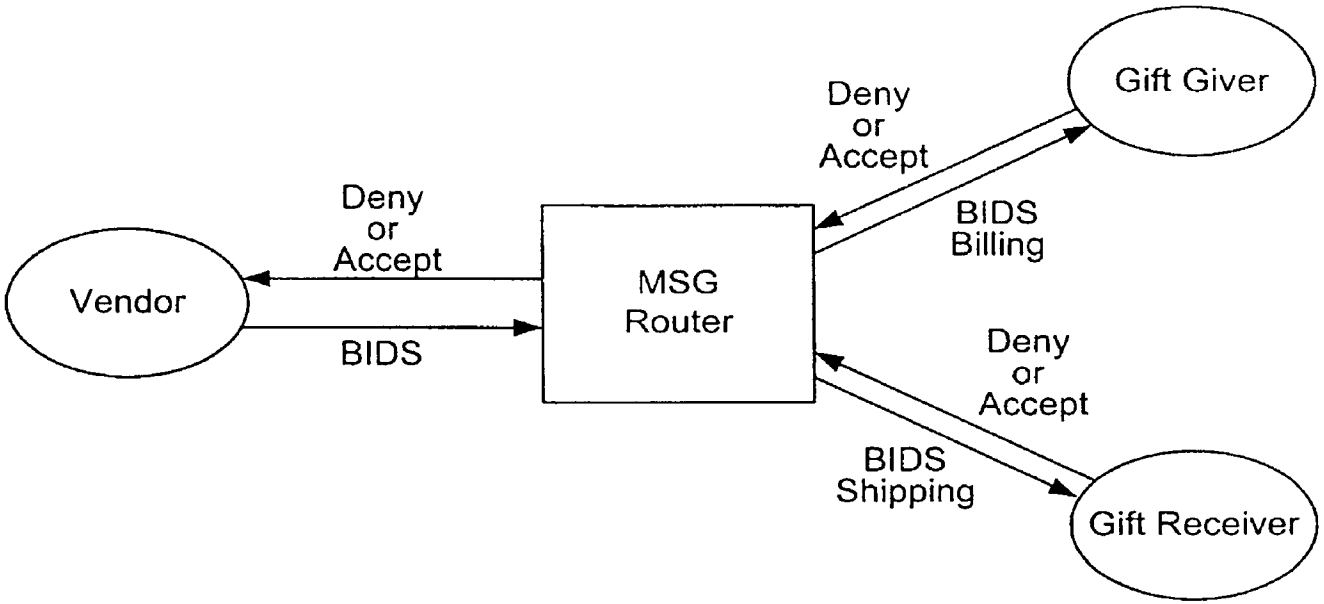
FIG. 6 is a block diagram showing the various parties and possible message passing between the parties in accordance with one embodiment of the present invention.

FIG. 6 is a block diagram showing the various parties and possible message passing between the parties in accordance with one embodiment of the present invention. The parties shown are the vendor or store merchant, a gift giver (information requester) and gift recipient (information granter). In between the parties is a message router that is part of the privacy bank server. A vendor sends out a BIDS which is routed by the message router. The BIDS billing portion is sent to the gift giver and the BIDS shipping information is sent to the gift receiver. Both the gift receiver and gift giver reply with either an Accept or Deny to the BIDS request. The Accept or Deny messages from the parties are then sent to the Vendor. If the gift receiver sends a Deny message, he is indicating that he does not want to share his information with the gift giver. Although it is possible for the gift giver to deny the BIDS shipping request, it is unlikely since he is typically the one requesting the information from the gift receiver. Once the vendor receives the messages, it acts accordingly by either shipping out the goods or sending a message to the gift giver that the BIDS shipping information request was denied.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for facilitating sharing of information in a computer network in which the information is used to at least partially complete an online form, the method comprising:

accessing, at a host computer, a first data profile containing a non-filtered set of data corresponding to a first user;

creating, at the host computer, a filtered first data profile containing a *plurality of* filtered [set] *sets* of data, *each of which constituting a respective persona of the first user*, wherein the *plurality of* filtered [set] *sets* of data [is] *are* taken from the first data profile;

coalescing, at the host computer, data from the filtered first data profile and data from a second data profile to construct a third data set, wherein the third data set is converted to shippable code;

transmitting the shippable code including the third data set to a client computer, wherein the third data set is used to complete the online form such that certain data items required by the online form relating to the first user are taken from the filtered first data profile portion of the third data set; and[,]

receiving, at the host computer, a completed online form when the online form contains a modified data item, wherein the first data profile is updated with the modified data item, and wherein the completed online form includes viewable profile data populated from the filtered first data profile portion of the third data set.

2. The method of claim 1, wherein the step of creating the filtered first data profile further comprises selecting particular data items from the first data profile that the first user intends to share with a computer network user.

3. The method of claim 1, wherein the step of creating the filtered first data profile further comprises creating the filtered first data profile for a specific computer network user.

4. The method of claim 3, wherein the specific computer network user is a gift giver and the first user is a gift receiver.

5. The method of claim 1, wherein the filtered first data profile inherits privacy preferences from data items in the first data profile.

6. The method of claim 5, wherein privacy preferences attached to the filtered first data profile determine how the filtered first data profile will be used.

7. The method of claim 1, wherein the step of coalescing data from the filtered first data profile and data from the second data profile further comprises extracting data from the filtered first data profile relating to shipping and specific characteristics of the first user and extracting data from the second data profile relating to billing.

8. The method of claim 1 further comprising automatically filling in the online form with data from the third data set once the first user has been selected by a second user.

9. The method of claim 8 further comprising requesting access to use the second data profile in response to a notification to fill in the online form.

10. The method of claim 9 further comprising granting access to the second data profile thereby enabling a computer network user to fill in the online form.

11. A method of allowing an information requester to access data from an information provider in order to complete an online merchant form, the method comprising:

creating, at a host computer, a *plurality of* filtered data [set] *sets* containing data that the information provider is willing to share with particular third-party users, including the information requester, *each of the plurality of filtered data sets constituting a respective persona of the information provider*;

retrieving, at the host computer, the online merchant form upon request by the information requester, the online merchant form having a plurality of fields;

inserting, at the host computer, data from the information requester into a first subset of the plurality of fields;

constructing, at [said] *the* host computer, a shippable code including *one of* the *plurality of* filtered data [set] *sets*;

transmitting the shippable code including the *one of the plurality of* filtered data [set] *sets* to a client computer, wherein the *one of the plurality of* filtered data [set] *sets* is inserted into a second subset of the plurality of fields, wherein the online merchant form is from an online merchant not affiliated with any other online merchant; and[.]

receiving, at the host computer, a completed online merchant form directly from the client computer upon submission of the completed online form, when the online merchant form contains a modified data item, wherein a first data profile is updated with the modified data item, and wherein the completed online merchant form includes viewable profile data populated from at least one of the data from the information requester and the data from the *one of the plurality of* filtered data [set] *sets*.

12. The method of claim 11, wherein the online merchant is not associated with at least one of a network and a group of other online merchants.

13. The method of claim 11, further comprising:

dynamically updating *the one of plurality of* the filtered data [set] *sets* with updated information from the information provider such that the information requester has access to only the updated information.

14. The method of claim 13, wherein *the one of plurality of* the filtered data [set] *sets* is updated by editing an underlying unfiltered data set under the control of the information provider.

*15. A method comprising:*

*accessing, at a host computer for facilitating sharing of information to at least partially complete an online form, a first data profile containing a set of data corresponding to a first user;*

*creating, at the host computer, a filtered first data profile containing a plurality of filtered sets of data each of which constituting a respective persona of the first user, wherein the plurality of filtered sets of data are taken from the first data profile;*

*coalescing, at the host computer, data from the filtered first data profile and data from a second data profile to construct a third data set;*

*converting, at the host computer, the third data set to shippable code;*

*completing, at the host computer, the online form using the third data set, the completing comprising taking certain data items required by the online form relating to the first user from the filtered first data profile portion of the third data set;*

*transmitting, at the host computer, the shippable code to a client computer, wherein the third data set is used to complete the online form;*

*receiving, at the host computer, a completed online form in response to the completed online form containing the modified data item, wherein the completed online form includes viewable profile data populated from the filtered first data profile portion of the third data set; and*

*updating, at the host computer, the first data profile with the modified data item.*

*16. The method of claim 15, wherein creating the filtered first data profile further comprises receiving an indication that the first user has selected at least one particular data item from the first data profile to share with at least a further user.*

*17. The method of claim 15, wherein creating the filtered first data profile further comprises creating the filtered first data profile for a specific computer network user.*

*18. The method of claim 17, wherein the specific computer network user is a gift giver and the first user is a gift receiver.*

*19. The method of claim 15, wherein creating a filtered first data profile includes enabling the filtered first data profile to inherit privacy preferences from data items in the first data profile.*

*20. The method of claim 19, further comprising associating privacy preferences to the filtered first data profile that determine how the filtered first data profile will be used.*

*21. The method of claim 15, wherein coalescing data from the filtered first data profile and data from the second data profile further comprises extracting data from the filtered first data profile relating to shipping and specific characteristics of the first user and extracting data from the second data profile relating to billing.*

*22. The method of claim 15 further comprising automatically filling in the online form with data from the third data set in response to the first user has been selected by a second user.*

*23. The method of claim 22 further comprising requesting access to use the second data profile in response to a notification to fill in the online form.*

*24. The method of claim 23 further comprising granting access to the second data profile and enabling a computer network user to fill in the online form.*

*25. A method comprising:*

*creating, at a host computer to complete an online form, a plurality of filtered data sets containing data that the information provider is willing to share with particular third-party users, including the information requester, each of the plurality of filtered data sets constituting a respective persona of the information provider;*

*obtaining, at the host computer, in response to request by the information requester, information representing the online form, the online form having a plurality of fields;*

*inserting, at the host computer, data from the information requester into a first subset of the plurality of fields;*

*constructing, at the host computer, a shippable code including one of the plurality of filtered data sets;*

*transmitting, at the host computer, the shippable code to a client computer, wherein the one of the plurality of filtered data sets is used to complete the online form; and*

*receiving, at the host computer, a completed online form directly from the client computer in response to submission of the completed online form in response to the online form containing a modified data item, wherein the completed online form includes viewable profile data populated from at least one of: data from the information requester and data from the one of the plurality of filtered data sets; and*

*updating, at the host computer, a first data profile with the modified data item.*

*26. The method of claim 25, further comprising: dynamically updating the one of the plurality of filtered data sets with updated information from the information provider such that the information requester has access to only the updated information.*

*27. The method of claim 26, wherein the updating the one of the plurality of filtered data sets includes editing an underlying unfiltered data set under the control of the information provider.*

* * * * *